(12) United States Patent
Donovan et al.

(10) Patent No.: US 12,530,265 B1
(45) Date of Patent: Jan. 20, 2026

(54) CONTENT DELIVERY CONTROL AND DISTRIBUTION

(71) Applicant: Charter Communications Operating, LLC, St. Louis, MO (US)

(72) Inventors: Jason M. Donovan, Denver, CO (US); Nikhil H. Parikh, Arvada, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/774,284

(22) Filed: Jul. 16, 2024

(51) Int. Cl.
*G06F 12/00* (2006.01)
*G06F 11/14* (2006.01)
*H04L 43/08* (2022.01)

(52) U.S. Cl.
CPC .......... *G06F 11/1464* (2013.01); *H04L 43/08* (2013.01)

(58) Field of Classification Search
None
See application file for complete search history.

(56) References Cited

U.S. PATENT DOCUMENTS

| | | | |
|---|---|---|---|
| 8,996,607 B1* | 3/2015 | Bajaj | H04L 67/1006 709/217 |
| 2020/0186613 A1* | 6/2020 | Johns | H04L 67/60 |
| 2021/0382799 A1* | 12/2021 | Kawaguchi | G06F 16/1815 |
| 2023/0388106 A1* | 11/2023 | Craciun | H04L 61/4511 |

* cited by examiner

*Primary Examiner* — Daniel D Tsui
(74) *Attorney, Agent, or Firm* — Armis IP Law, LLC

(57) ABSTRACT

In response to detecting an inability to retrieve a first portion of a first title of content from a primary server using a first resource identifier (locator) value, a communication management resource associated with the communication device switches to use of a second resource identifier (locator) value to retrieve the first portion of the first title of content from a backup server. The communication management resource monitors passage of time in response to the detected inability. During the monitoring and switch over, the communication management resource retrieves segments of content from the backup server. Based on the monitored passage of time, such as after a predetermined time duration, the communication management resource eventually attempts to retrieve another portion of the first title of content from the primary server again using the first resource identifier value as an alternative to use of the second resource identifier value.

23 Claims, 10 Drawing Sheets

PLAYLIST
210

TITLE OF CONTENT #2 ("JAWS" MOVIE)

| PORTION | SPECIFIER |
|---|---|
| VID FILE #1 (SEG 1) | FILE PATH 1 |
| VID FILE #2 (SEG 2) | FILE PATH 2 |
| VID FILE #3 (SEG 3) | FILE PATH 3 |
| VID FILE #4 (SEG 4) | FILE PATH 4 |
| ... | ... |

FIG. 3

CONTENT DELIVERY CONTROL AND DISTRIBUTION

BACKGROUND

It is desirable to provide high-availability and reliable distribution of content to one or more communication devices in a network. Accordingly, a conventional content delivery network may include a primary server and a secondary server (such as backup server) to distribute requested content to communication devices in the network.

As an example illustrating use of a conventional content delivery network, assume that a respective communication device initially communicates with the primary server to retrieve requested content. In the event that the primary server becomes unavailable (such as due to a failure of the primary server), the respective communication device can be notified from an entity disposed outside of the respective communication device to communicate with the secondary server (backup server) to retrieve the request content instead of communicating with the primary server.

BRIEF DESCRIPTION OF EXAMPLES

This disclosure includes the observation that conventional techniques of distributing content from multiple different servers suffer from deficiencies. For example, it may be difficult to notify a communication device when the primary server fails in a content delivery network via transmission of communications over the content delivery network. In such an instance, it is difficult to redirect the communication device to a respective backup server.

To provide improved distribution of content in a network environment, a communication device (such as a client communication device) as discussed herein is configured to retrieve different titles of content (such as a first title of movie content, second title of movie content, etc.) and corresponding video segments from a first server. During conditions in which the first server is unavailable such as due to a failure or any other reason, the communication device is able to retrieve the different titles of content or portions (segments) thereof from a second server. In other words, the second server can be configured to serve as a backup server with respect to the first server.

In one example as discussed herein, in response to detecting an inability to retrieve a first portion of a first title of content from a first server using a first resource identifier value (indicating a location of the first server), the communication device switches to use of a second resource identifier value (such as indicating a location of the second server) to retrieve the first portion of the first title of content from a second server. The communication device or other suitable entity associated with the communication device can be configured to monitor passage of time with respect to or in response to the detected inability to retrieve the first portion of the first title of content from the first server. Based on the monitored passage of time, the communication device can be configured to switch over to attempted retrieval of a second portion of the first title of content from the first server using the first resource identifier value as an alternative to use of the second resource identifier value.

In other words, as previously discussed, the communication device may be required to switch over to retrieving the requested content from the second server (backup server). The monitoring of the passage of time provides an indication when the communication device should attempt switching over to retrieval of the requested content from the first server again.

As previously discussed, the second server may be a backup server with respect to the first server. The second server can be configured to distribute the first title of content including the first portion (such as first segment) of the first title of content and the second portion (such as second segment) of the first title of content during conditions in which the first server or corresponding network experiences a failure.

In one example, the communication device attempts to retrieve the second portion of the first title content from the first server in response to detecting that the monitored passage of time is greater than a threshold level (such as predetermined time duration). The passage of time may be measured with respect to any suitable reference event. For example, the passage of time may be measured with respect to a time instance associated with the detected inability to retrieve the first portion of the first title of content from the first server.

Yet further, note that the first resource identifier value can be configured to specify the first server; the second resource identifier value can be configured to specify a second server, the second server being a backup server with respect to the first server.

In still further examples, detection of the inability to retrieve the first title of content from the first server may include the communication device (client device) or other suitable entity: transmitting a first message from the client device to the first server to retrieve the first portion of the first title of content, the first message may include the first resource identifier value for use a first network address of the first server derived from the first resource identifier value, the first resource identifier value specifying a network address assigned to the first server; and failing to receive the first portion of the first title of content from the first server within a predetermined amount of time as measured by the passage of time. Use of the second resource identifier value to retrieve the first portion of the first title content may include the client device: i) substituting the first identifier resource in the first message with the second identifier resource to produce a second message destined for delivery to a second server, the second server being a backup server with respect to the first server to distribute the first title of content, the second identifier resource specifying a network address of the second server; and ii) transmitting the second message from the client device to a second server to retrieve the first portion of the first title of content.

Further examples as discussed herein include the communication device or other suitable entity starting a timer in response to detecting the inability of the communication device to retrieve the first portion of the first title of content from the first server using the first resource identifier value. For example, as previously discussed, the communication device can be configured to temporarily switch over to retrieval of the requested first title of content from the second server while the first server is unavailable. The communication device may not know how long the first server or corresponding network will be unable to deliver segments (portions) of the first title of content. The communication device or other suitable entity then uses the timer as a basis in which to switch back to attempting retrieval of one or more portions of the first title of content from the first server.

Thus, in one example, in response to detecting an inability to retrieve the second portion of the first title of content from the first server using the first resource identifier value (such as a first fully qualified domain name specifying the location of the first server), the communication device as discussed herein attempts to retrieve the second portion of the first title of content from the second server using the second resource identifier value (such as a second fully qualified domain name specifying the location of second server). Eventually, after a first passage of time as measured by the time monitor function, the communication device again attempts to retrieve one or more portions of the first title of content from the first server again. Assume in this example that the first server is still unable to distribute portions of the first title of content to the communication device. In such an instance, the communication device detects this continued failure condition (inability as previously discussed) and then monitors a second passage of time with respect to the detected inability to retrieve the second portion of the first title of content from the first server using the first resource identifier value. Based on the monitored second passage of time via the time monitor function, the communication device attempts to retrieve a third portion of the first title of content from the first server using the first resource identifier value as an alternative to use of the second resource identifier value.

Accordingly, the communication device as discussed herein can be configured to implement one or more timers as well as, based on the one or more timers, switch between use of the first resource identifier value (such as network address value or other resource identifier) and the second resource identifier value (such as a second network address value or other resource identifier) to retrieve different portions of the first title of content.

Thus, a communication device may detect the inability to retrieve requested content from the first server and temporally switch over to retrieval of the content from the second server. The temporary switch over may be based on a threshold amount of time as measured by the monitored passage of time. More specifically, the communication device can be configured to start a respective timer (time monitor function) with respect to the detected inability to retrieve the first portion of the first title of content from the first server. As previously discussed, the backup mode, the communication device retrieves the first portion and potentially additional portions of the first title of content from the second server (backup server) until the respective timer reaches a threshold level. At such time, the communication device switches over to attempting to retrieve another portion of the first title of content from the first server just in case the first server becomes available for retrieval of content. This technique of temporarily switching over to requesting retrieval of content from the second server for a certain amount of time alleviates the need for an entity other than the communication device to notify the communication device to switch back to attempting retrieval of content from the first server. In other words, the time monitor function provides a basis in which the communication device determines when to attempt retrieval of content from the first server again after the detected failure of the first server.

Note that any of the resources as discussed herein can include one or more computerized devices, communication management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different examples as described herein.

Yet other examples herein include software programs to perform the steps and operations summarized above and disclosed in detail below. One such example comprises a computer program product including computer readable storage hardware (such as hardware to store executable instructions), or non-transitory computer-readable storage media, etc., on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, examples herein are directed to a method, system, computer program product, etc., that supports operations as discussed herein.

One example as discussed herein includes a computer readable storage medium and/or system having instructions stored thereon to facilitate better use of available wireless resources. The instructions, when executed by computer processor hardware, cause the computer processor hardware (such as one or more co-located or disparately processor devices or hardware) to: in response to detection of an inability to retrieve a first portion of a first title of content from a first server using a first resource identifier value, switch to use of a second resource identifier value to retrieve the first portion of the first title of content from a second server; monitor passage of time in response to the detected inability; and based on the monitored passage of time, attempt to retrieve a second portion of the first title of content from the first server using the first resource identifier value as an alternative to use of the second resource identifier value.

Note that the ordering of the steps above has been added for clarity sake. Further note that any of the processing steps as discussed herein can be performed in any suitable order.

Other examples of the present disclosure include software programs and/or respective hardware to perform any of the method example steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of content distribution. However, it should be noted that examples herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of examples herein (BRIEF DESCRIPTION OF EXAMPLES) purposefully does not specify every example and/or incrementally novel aspect of the present disclosure or claimed invention(s). Instead, this brief description only presents general examples and corresponding points of novelty over conventional techniques. For additional details and/or possible perspectives (permutations) of the invention(s), the reader is directed to the Detailed Description section (which is a summary of examples) and corresponding figures of the present disclosure as further discussed below.

BRIEF DESCRIPTION OF THE DRAWINGS

FIG. 3 is an example diagram of playlist information supporting retrieval of different segments of content as discussed herein.

Figure 1:
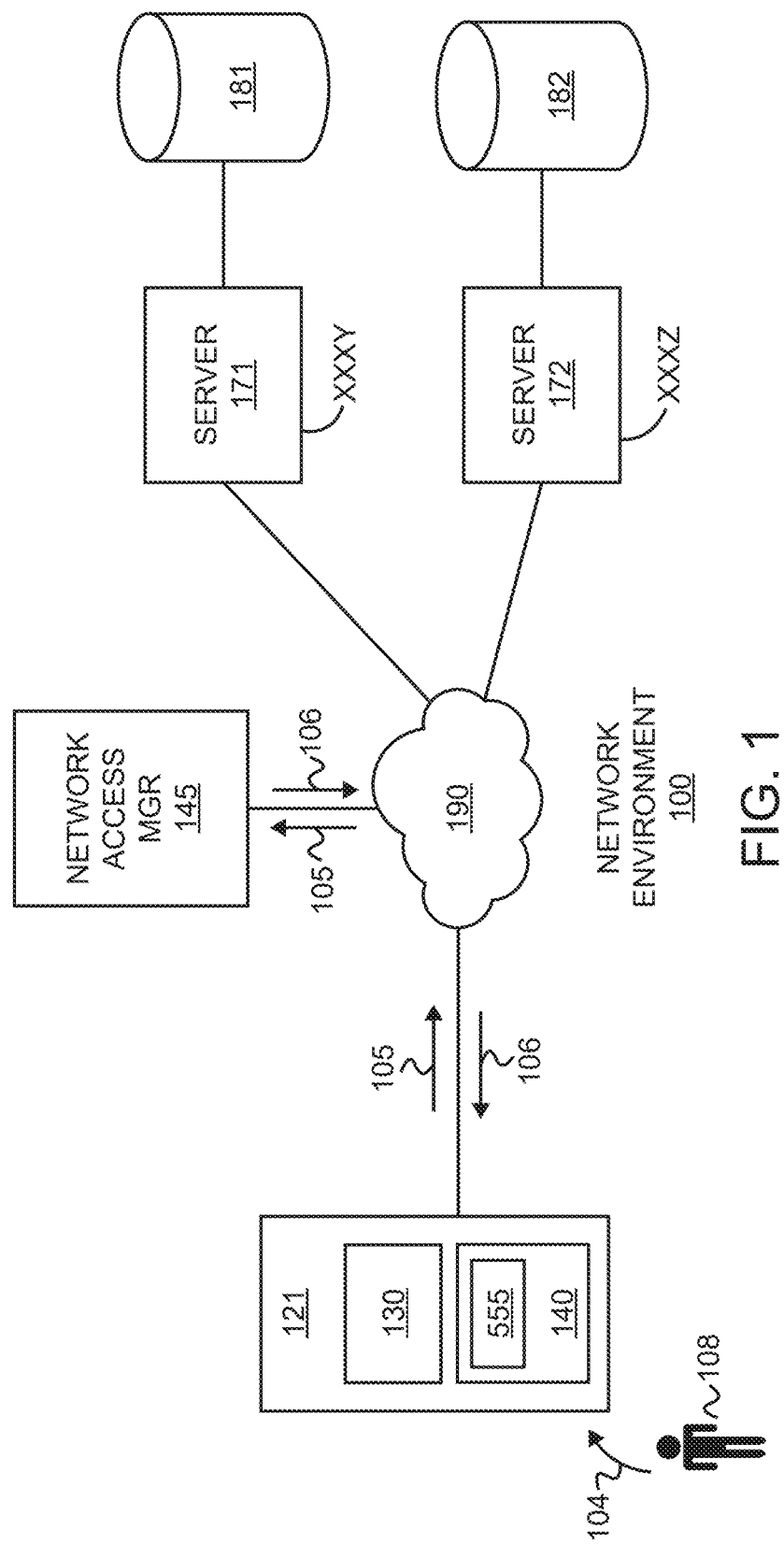
FIG. 1 is an example diagram illustrating a network environment including multiple content delivery networks to distribute requested content to one or more communication devices as discussed herein.

The foregoing and other objects, features, and advantages of the invention will be apparent from the following more particular description of preferred examples herein, as illustrated in the accompanying drawings in which like reference characters refer to the same parts throughout the different views. The drawings are not necessarily to scale, with emphasis instead being placed upon illustrating the examples, principles, concepts, etc.

DETAILED DESCRIPTION

A network environment as discussed herein implements multiple content delivery networks (CDNs) for delivering streaming video to clients. The content delivery networks (such as a first server, the second server, etc.) may include a primary CDN and a backup CDN for content delivery. If the primary CDN (such as one or more servers) becomes unhealthy (such as unavailable due to a respective failure), it is desirable that the client communication device communicates with the backup CDN (backup one or more service) to retrieve the requested content. It is further desirable as discussed herein to implement a method and system that provides continuous distribution of content to the client device without interruption, even though the respective primary CDN fails.

There are flaws associated with simply transmitting a respective notification to the client communication device to switch over to receiving content from the secondary CDN because the primaries CDN is unavailable.

Techniques herein include a method and system in which the client communication device itself (such as via a time monitor function) detects when the primary CDN is unreachable (such as unavailable to deliver content). Upon detecting the failure, the communication device switches over to retrieving the content from the backup CDN on its own without direction from any other entity. Further, as discussed herein, the communication device also can be configured to switch over to retrieving portions of the requested content from the primary CDN again based on monitoring passage of time. In other words, after a certain amount of time, the client communication device can be configured to attempt retrieval of the requested content from the primary CDN again.

As a more specific example, a service provider network may control a vast network with many different links connecting all of the network segments. For video delivery, the vast network may include a CDN that delivers the video (different titles of content) to respective clients who are connected to the edge of this network via any suitable means such as cable modems at their homes. As previously discussed, the network may include a backup CDN to deliver respective content if the primary CDN fails. Techniques herein include pointing the client communication device to the backup CDN in the event that the primary the primary CDN is unhealthy or unreachable by the client. The primary CDN may be unhealthy if the CDN application fails due to software failure, handling more load than the server is capable of handling, or if the server itself fails.

The CDN may be unreachable by the clients if the network path connecting the clients to the primary CDN breaks, which may happen as a result of a bad routing configuration or a physical fiber cut in the network severing the link. When either of these situations happens, the client communication device will make a request to the primary CDN and fail to get a proper response or any response at all within a timeout time duration. Techniques as discussed herein include supplemental logic (a.k.a., monitoring function) for execution by the client communication device. In the event that the primary CDN becomes unavailable for retrieval of content, the supplemental logic in the client communication device can be configured to replace a fully qualified domain name (FQDN) in the streaming URI that the client is using to point to (retrieve content from) the primary CDN with the FQDN pointing to the backup CDN. The client communication device transmits the request for content to the backup CDN via the replacement FQDN.

By doing this (producing a request with a fully qualified domain name with the backup CDN and sending such a request to the backup CDN), the client transmits requests to the backup CDN for retrieving the video content when the primary CDN is unavailable. Because it is desirable to use the primary CDN when it is healthy and available again, techniques herein include implementing a wait timer in the client communication device so that the client communication device continues to replace the primary FQDN with the backup FQDN (in the request) until the timer expires. When the timer expires, the client communication device discontinues replacing the FQDN and tries communicating requests with the FQDN of the primary CDN again.

If the primary CDN still fails to supply the requested content, this triggers the client communication device to implement the monitoring function again to start replacing the primary FQDN with the backup FQDN and again implement the wait timer. After each timeout implemented by the time monitor function, the client can be configured to continue attempted switch over of retrieving content from the primary CDN until the primary CDN is healthy and reachable. After the client communication device is able to successfully retrieve the requested content from the primary CDN again, the client communication device continues to retrieve the requested content from the primary CDN. If the retrieval of content from the primary CDN continues to fail after reverted attempts, the client communication device continues to implement the above monitor function until the primary CDN is available again for retrieval of the requested content. For example, the client communication device can be configured to wait a certain amount of time each time a failure is detected before attempting to retrieve the requested content from the primary CDN again.

Accordingly, examples herein include the communication management resource operative to: in response to detecting an inability to retrieve a first portion of a first title of content from a first server using a first resource identifier value, switch to use of a second resource identifier value to retrieve the first portion of the first title of content from a second server; monitor passage of time in response to the detected inability; and based on the monitored passage of time, attempt to retrieve a second portion of the first title of content from the first server using the first resource identifier value as an alternative to use of the second resource identifier value.

Now, more specifically, with reference to the drawings, FIG. 1 is an example diagram illustrating a network environment including multiple content delivery networks to distribute requested content to communication devices as discussed herein.

As shown, network environment 100 includes a communication device 121, network 190, network access control manager 145, primary server 171 (a.k.a., primary content delivery network), repository 181, backup server 172 (a.k.a., backup content delivery network), and repository 182.

As further shown, the communication device 121 (a.k.a., user equipment, mobile communication device, etc.) is operated by the user 108 to control display of playing back retrieved segments of content (such as files of video, images, audio, etc.) on the respective display screen 130 and speaker. The communication device 121 executes the communication management resource 140 supporting the retrieval and playback of corresponding content.

As further discussed herein, the communication management resource 140 implements the time monitor function 555 to control which of multiple servers to retrieve requested content.

Note that each of the resources in network environment 100 can be configured to include or be configured as appropriate hardware, software, or combination of hardware and software to carry out respective operations as discussed herein.

For example, the communication management resource 140 as described herein can be implemented via respective communication management hardware, communication management software, or a combination of communication management hardware and communication management software; the time monitor function 555 can be implemented as time monitor hardware, time monitor software, or a combination of time monitor hardware and time monitor software; the network access manager 145 can be implemented as network access manager hardware, network access manager software, or a combination of network access manager hardware and network access manager software; the server 171 can be implemented as server hardware, server software, or a combination of server hardware and server software; server 172 can be implemented as server hardware, server software, or a combination of server hardware and server side software; and so on.

In this example, assume that the user 108 provides input 104 such as selection of content for playback on the display screen 130 of the communication device 121. In response to receiving the input 104, the communication management resource 140 transmits the communications 105 over the network 190 to the network access manager 145. Assume that the communications 105 include notification of a respective title of content #2 (such as a particular movie, i.e., content, available from either server 171 or server 172). In other words, the communications 105 indicates that the user 108 operating the communication device 121 is requesting playback of a corresponding title of content #2. The communication management resource 140 is configured to retrieve the requested content from the server 171 if it is available for distributing content.

The network access manager 145 can be configured to verify that the user 108 and corresponding communication device 121 are authorized to retrieve and playback the requested title of content #2. In such an instance, in response to receiving the communications 105 and request to playback a corresponding title of content #2 (such as video content available from the server 171 or the server 172) from the communication device 121, the network access manager 145 transmits communications 106 in a reverse direction over the network 190 to the communication management resource 140.

Figure 2:
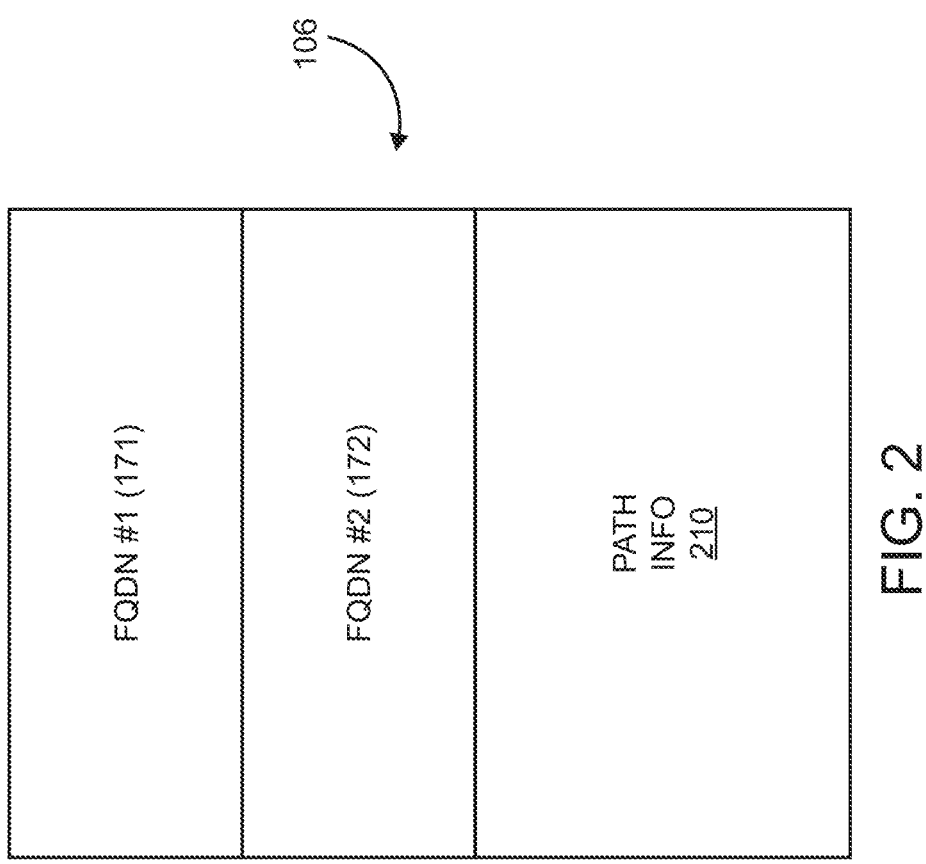
FIG. 2 is an example diagram illustrating message information including a first fully qualified domain name and a second fully qualified domain name as discussed herein.

In one example, the communications 106 include the information as shown in FIG. 2.

FIG. 2 is an example diagram illustrating message information including a first fully qualified domain name and a second fully qualified domain name as discussed herein.

In this example, in response to receiving the request for retrieval and playback of the title of content #2 (as indicated by communications 105) on the display screen 130 of the communication device 121, the network access manager 145 provides information regarding multiple servers from which to retrieve the requested title of content #2.

For example, as shown in the communications 106, the network access manager 145 provides a first fully qualified domain name fully qualified domain name #1 or FQDN #1) and a second fully qualified domain name (fully qualified domain name #2 or FQDN #2).

Assume in this example that the first fully qualified domain name #1 provided by the network access manager 145 in communications 106 is a first resource locator indicating a location of the server 171. For example, the first fully qualified domain name #1 name may be "WWW.SERVER1.COM" or other text string identifying the location of the server 171. A DNS entry and a corresponding domain name server 440 can be configured to map this fully qualified domain name #1 to the network address XXXY assigned to the server 171. In other words, the fully qualified domain name #1 is a resource locator corresponding to network address XXXY indicating the location of the server 171. In such an instance, when the fully qualified domain name #1 is used by the communication device 121 corresponding communication management resource 140 to retrieve corresponding content (segments or files associated with the respective requested video content), a respective domain name server 440 or other suitable entity converts the fully qualified domain name into the network address XXXY and provides it to the communication device 121 for delivery of any respective communications to the server 171.

Assume in this example that the second fully qualified domain name #2 provided by the network access manager 145 in communications 106 is a second resource locator indicating a location of the server 172 (such as a backup server with respect to the server 171). For example, the second fully qualified domain name #2 may be "WWW.SERVER2.COM" or other text string identifying the location of the server 172. The DNS entry and a corresponding domain name server can be configured to map this fully qualified domain name #2 to the network address XXXZ assigned to the server 172. In other words, the fully qualified domain name #2 is a resource locator corresponding to network address XXXZ indicating the location of the server 172. In such an instance, if needed, when the fully qualified domain name #2 is used by the communication device 121 and corresponding communication management resource 140 to retrieve corresponding content (segments or files associated with the respective requested video content), a respective domain name server or other suitable entity converts the fully qualified domain name "WWW.SERVER2.COM" into the network address XXXZ and provided to the communication device 121 for delivery of any respective communications to the server 172.

As further shown, the communications 106 from the network access manager 145 may include a corresponding playlist 210 including information specifying paths (indicating where respective segments are stored in a repository such as repository 181 or repository 182) associated with retrieving different segments of the requested title of content #2. Note that the repository 181 and the repository 182 can be configured to store the segments based upon the same path information. Thus, the file path information specifying where the respective segments are stored may be the same for both the server 171 and the server 172.

FIG. 3 is an example diagram of playlist information supporting retrieval of different segments of content as discussed herein.

As previously discussed, in response to requesting retrieval and playbook of the corresponding title of content #2 (such as a movie JAWS), the network access manager 145 or other suitable entity provides a respective playlist 210 associated with the requested title of content #2 to the communication management resource 140.

In one example, the playlist 210 identifies the different files (a.k.a., segments of content) associated with the requested title of content #2. As shown, the playlist 210 may include file path information indicating a particular file (such as segment of content) associated with the requested title of content #2. For example, the first segment (SEG1) associated with the title of content #2 corresponds to a first video file retrievable via the file path information such as "file path #1" to be used by either the server 171 or server 172 to map the segment request to an appropriate segment (SEG1) of the requested content; the second segment (SEG2) associated with the title of content #2 corresponds to a second video file retrievable via the file path information such as "file path #2" to be used by either the server 171 or server 172 to map the segment request to an appropriate segment (SEG2) of the requested content; the third segment (SEG3) associated with the title of content #2 corresponds to a third video file retrievable via the file path information such as "file path #3" to be used by either the server 171 or server 172 to map the requests to an appropriate segment (SEG3) of the requested content; and so on.

Thus, as further discussed herein, the file path information in the playlist 210 can be used by the communication device 121 to identify and retrieve different segments of the respective title of content #2 for playback over time.

Referring again to FIG. 1, as further discussed herein, the communication management resource 140 can be configured to request retrieval of a corresponding first portion of the second title of content #2 from the server 171. The communication management resource 140 may detect that the server 171 does not respond to the request for retrieval of the corresponding first portion of the second title of content #2. The detecting of the inability of the server 171 to distribute requested content may include the communication management resource 140 transmitting a respective request for the corresponding portion of the second title of content #2 and not receiving a response from the server 171 within a timeout duration (such as 3 seconds or other suitable amount).

In response to the communication management resource 140 or other suitable entity detecting an inability to retrieve a first portion (such as file, segment, etc.) of a title of content #2 from the first server 171 using a first resource identifier value such as the fully qualified domain name #1 (FQDN #1) and/or corresponding network address XXXY, the communication device 121 and corresponding communication management resource 100 can be configured to switch to use of a second resource identifier value such as the second fully qualified domain name #2 (FQDN #2) and/or corresponding network address XXXZ to retrieve the first portion of the title of content #2 from the server 172.

In other words, the switching use to the second resource identifier value (such as FQDN #2 and/or network address XXXZ) includes the communication management resource 140 transmitting the request for the first portion of the title of content #2 to the second server 172, which serves as a backup when the first server 171 is unavailable.

In further examples, the communication management resource 140 implements the time monitor function 555 to monitor passage of time in response to the detected inability of the server 171 to distribute the segments (a.k.a., portions) of the requested content. In one example, after the switchover, the communication management resource 140 continues to request additional portions of the second title of content #2 from the server 172 until a threshold time limit is reached by the monitoring of the passage of time via the time monitor function 555. Accordingly, based on the monitored passage of time such as reaching a threshold level of time as indicated by the time monitor function 555, the communication management resource 140 attempts to retrieve another portion of the title of content #2 from the second server using the first resource identifier value (fully qualified domain name #1) as an alternative to use of the second resource identifier value (fully qualified domain name #2).

In other words, the techniques as discussed herein include a client centric implementation in which the client communication device such as communication device 121 and corresponding communication management resource 140 detect a respective inability of the server 171 to distribute content over the network 190 to the communication device 121. In response to these circumstances such as detected failure of the server 171 or detected failure in the network 190 supporting connectivity between the communication device 121 and the server 171, the communication device 121 and corresponding communication management resource 140 temporarily switch to retrieval of one or more portions of the title of content #2 from the server 172. The time monitor function 555 is used as a basis in which to determine when to switch back to trying to retrieve segments of content from the server 171 again.

Figure 4:
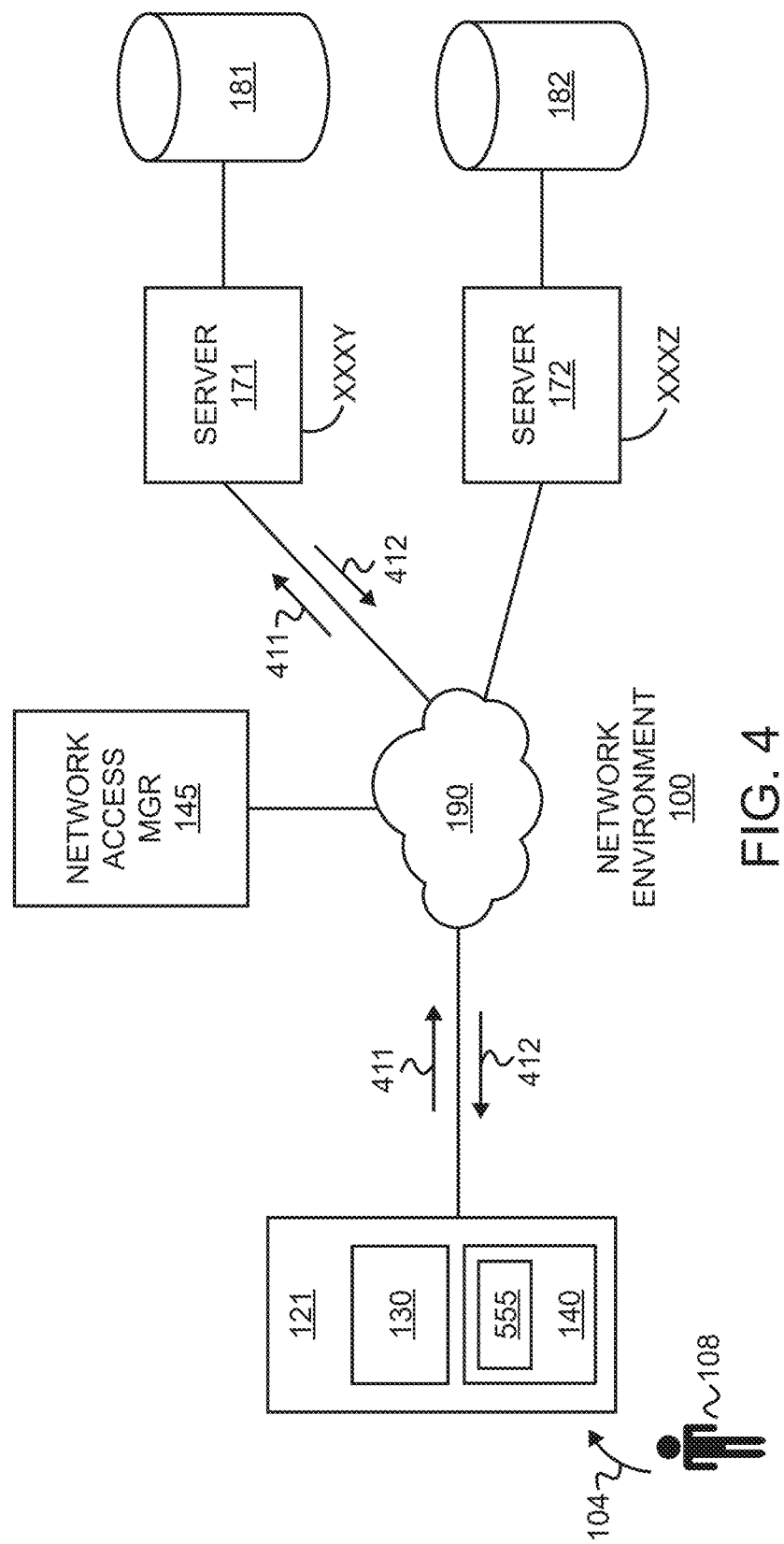
FIG. 4 is an example diagram illustrating successful retrieval and an attempt to retrieve requested content using a first fully qualified domain name as discussed herein.

FIG. 4 is an example diagram illustrating an attempt to retrieve requested content using a first fully qualified domain name as discussed herein.

In this example as shown in FIG. 4, using the fully qualified domain name #1, the communication device 121 transmits communications 411 over the network 190 to the primary server 171 to retrieve different portions of the title of content #2 from the server 171. Based on the requests for the different portions of content, the server 171 transmits the requested portions over the network 190 to the communication device 121.

Figure 5:
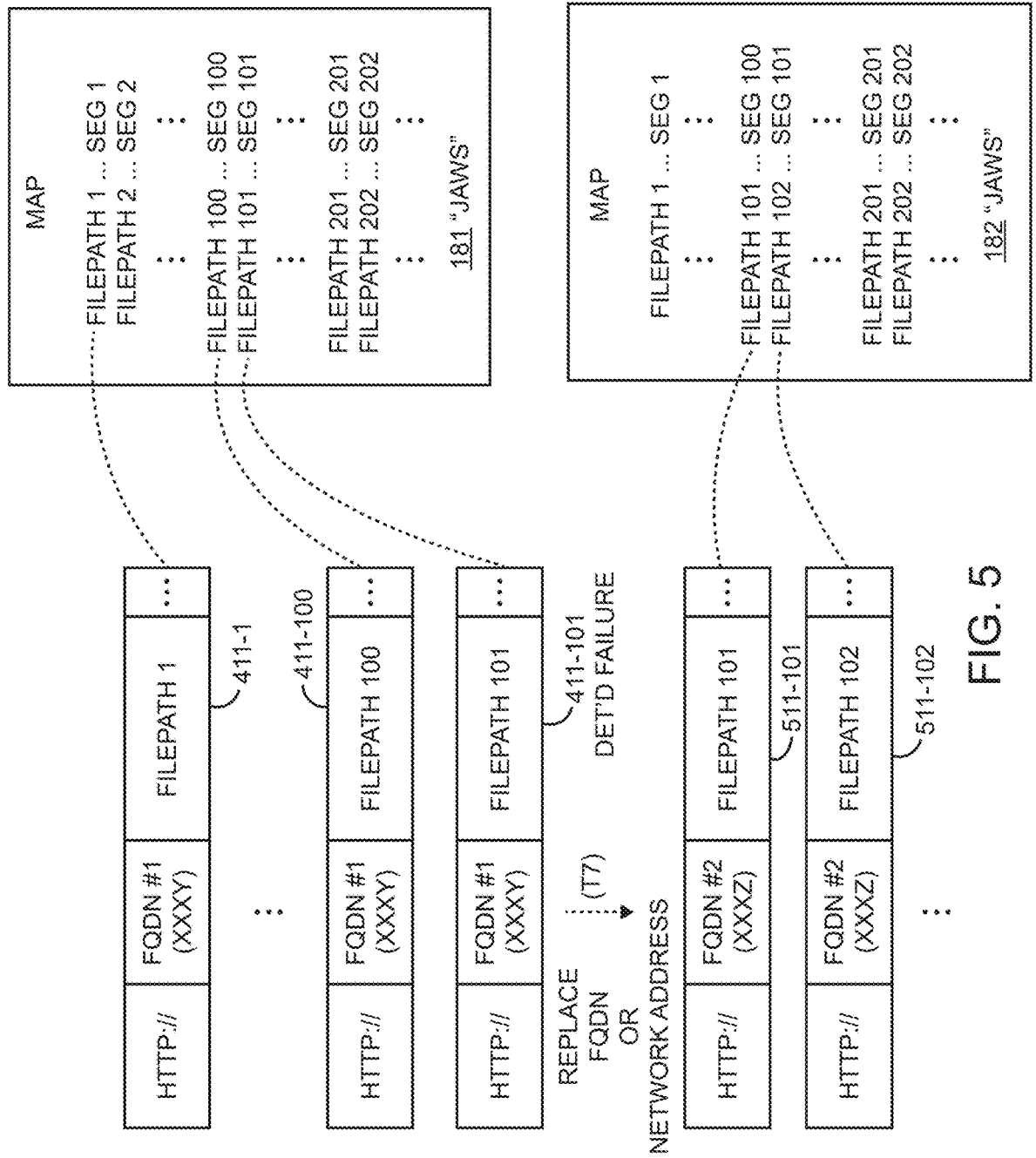
FIG. 5 is an example diagram illustrating use of the second fully qualified domain name to retrieve requested content from the second content delivery network in response to a detected inability of a first content delivery network to distribute the requested content as discussed herein.

A more detailed example of the request communications 411 transmitted by the communication device 121 and corresponding communication management resource 140 is shown in FIG. 5. In general, the communication management resource 140 uses the first fully qualified domain #1 to retrieve segments (portions) 1 through 100 of the second title of content #2 up until a failure (segment 101) in which the communication device 121 is no longer able to retrieve segments of the title of content #2.

In other words, as shown in FIG. 5, after successfully retrieving the segments 1 through 100, at time T7, the communication device 121 attempts retrieval of the segment 101 via respective communications 411 over the network 190 to the server 171. Because of a failure (such as the server 171 being unable to deliver the requested segment 101 to the communication device 121), the communication device 121 does not receive the requested segment 101 of the title of content #2 from the server 171.

In one example, as previously discussed, the communication device 121 corresponding communication management resource 140 implement a respective timer (time monitor function 555) to detect the inability of the server 171 to deliver the requested segment 101. Assume that the communication device 121 detects no response from the server 171 within a time duration TD1 (timeout period) after requesting retrieval of the segment 101 at time T3. Assume that the time T7 is equal to the time T3 plus the time duration TD1. Because the communication device 121 and corresponding communication management resource 141 does not receive a response from the server 171 by time T7 (end of timeout time duration), the communication device 121 and corresponding communication management resource give up trying to retrieve the requested segment of content 101 from the server 171 and switch over to requesting retrieval of the segment 101 from the backup server 172.

As shown in FIG. 5, switch over to requesting retrieval of the segment 101 from the server 172 includes the communication management resource 140 transmitting the communications 511 to the server 172 to retrieve the segment 101 associated with the title of content #2.

Thus, FIG. 5 is an example diagram illustrating use of the second fully qualified domain name to retrieve requested content from the second content delivery network in response to a detected inability of a first content delivery network to distribute the requested content as discussed herein.

In one example, the switch over includes using the second fully qualified domain name #2 to generate the content requests messages transmitted to the server 172. In other words, at or around time T3, the communication device 121 transmits the communications 411-101 to include the fully qualified domain name #1 or the network address XXY and the corresponding file path 101 (specifying segment 101) to the server 171 for retrieval of the corresponding segment SEG1. After the timeout TD1 at time T7, the communication management resource 140 replaces the fully qualified domain the #1 and/or the network address XXXY used in the communications 411-101 directed to the server 171 to use of the communications 511-101 directed to the server 172. As previously discussed, the communications 411-101 may be identical to the communications 511-101 except that the latter communications 511-101 include the second fully qualified domain name #2 or network address XXXZ (directing the message to the server 172) instead of the first fully qualified domain name #1 (which otherwise would direct the message to the server 171).

Figure 6:
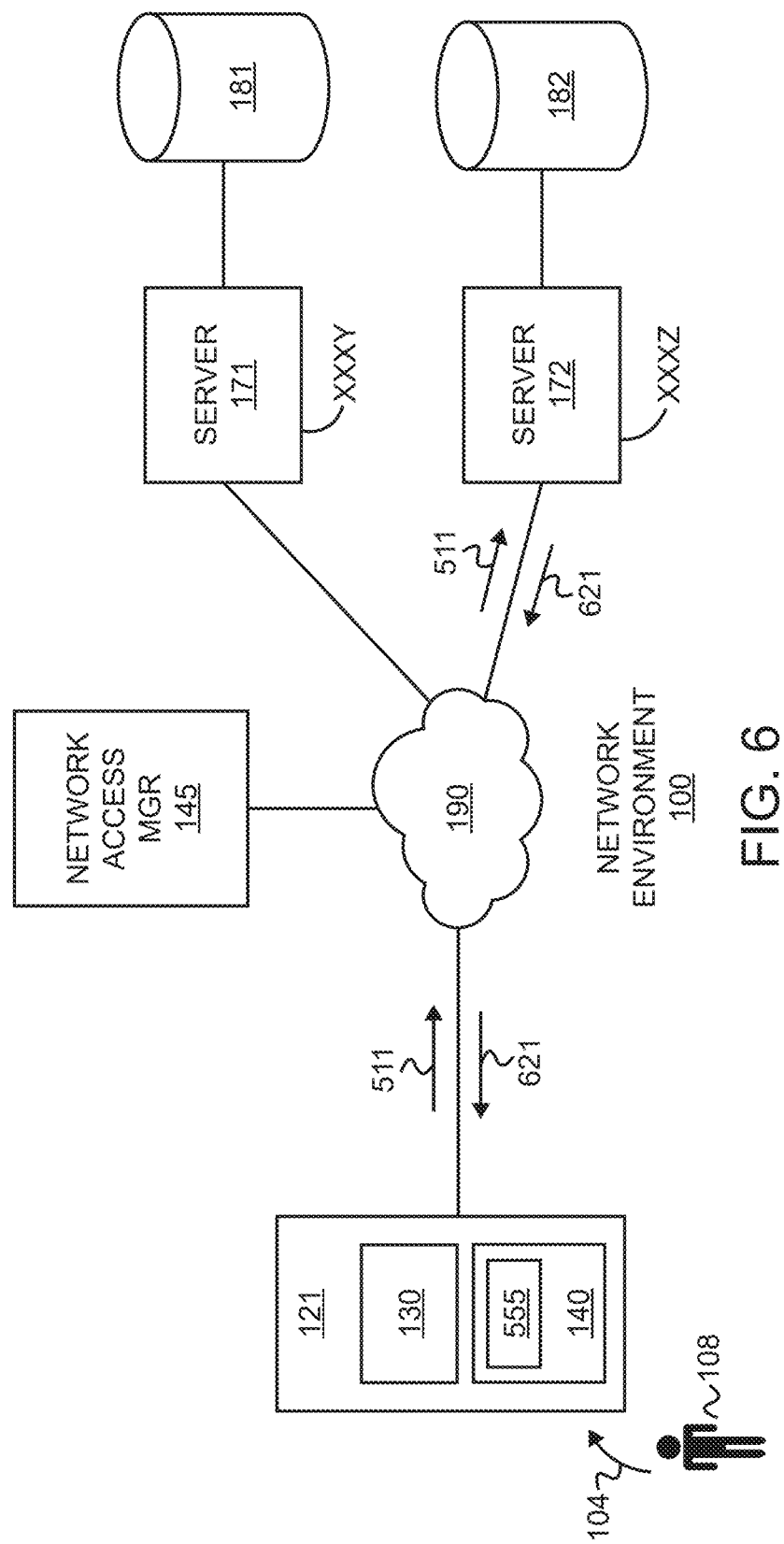
FIG. 6 is an example diagram illustrating use of the second fully qualified domain name to retrieve one or more segments of the requested content as discussed herein.

An example of the communication device 121 and corresponding communication management resource 140 retrieving additional segments of the title of content #2 from the server 172 is further shown in FIG. 6.

FIG. 6 is an example diagram illustrating use of the second fully qualified domain name to retrieve requested content as discussed herein.

As previously discussed, at or around time T7, the communication management resource 140 switches over from server 171 to retrieval of the requested title content #2 from the server 172 using the communications 511. In a further example, at or around the time of the switchover (such as time T3 or T7, etc.) of retrieving portions of the requested title of content #2, the communication management resource 140 operates the time monitor function 555 to track an amount of time with respect to the detected inability of the server 171 to provide portions of the requested title of content #2. More specific details of implementing the time monitor function 555 are shown in FIG. 7.

Figure 7:
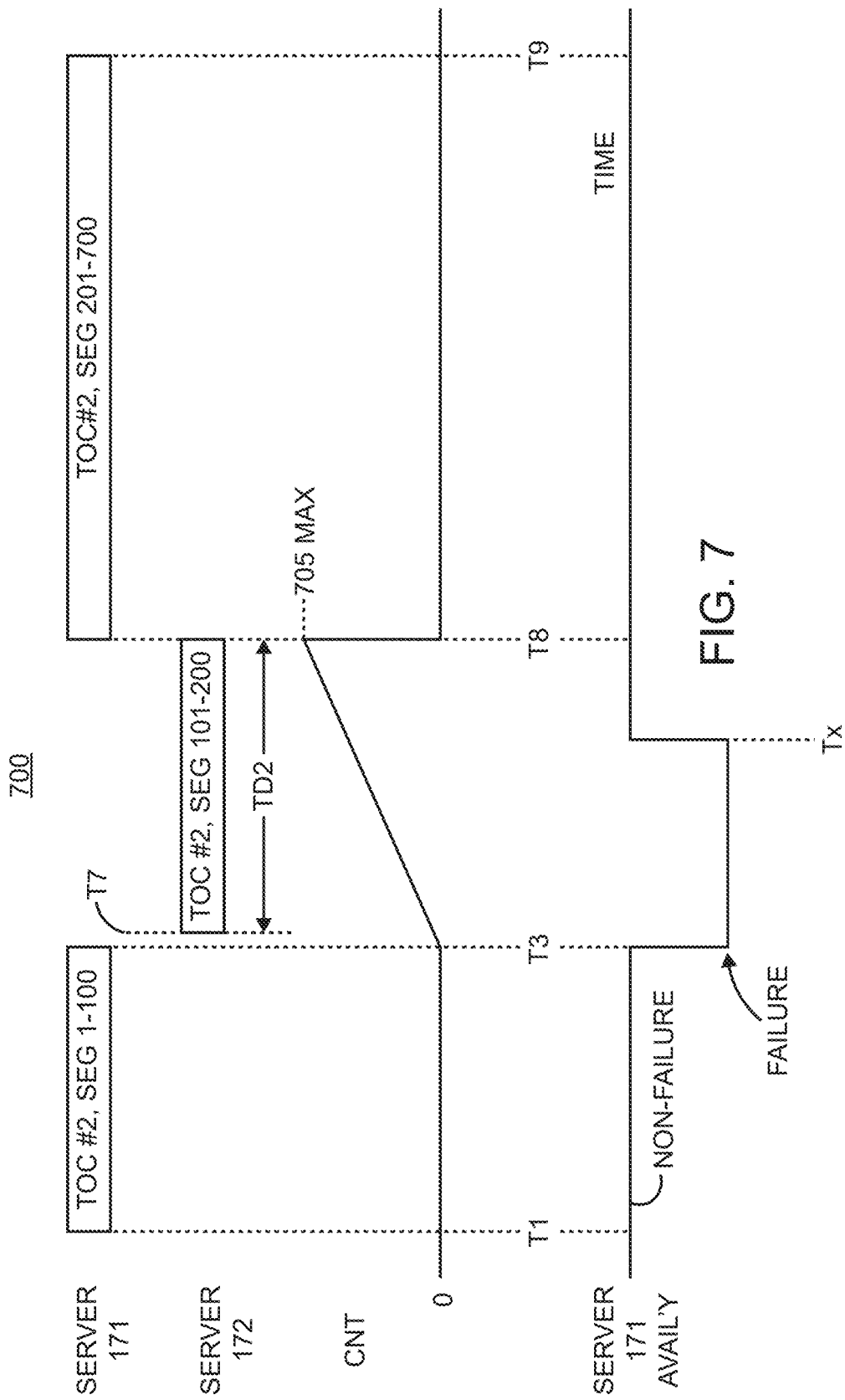
FIG. 7 is a timing diagram illustrating implementation of a time monitor function to control switchover of retrieving segments of content from the second content delivery network to the first content delivery network as discussed herein.

FIG. 7 is a timing diagram illustrating implementation of a time monitor function to control switchover of retrieving segments of content from the second content delivery network to the first content delivery network as discussed herein.

As shown in this example timing diagram 700, the communication device 121 transmits respective requests (one segment request after another) for different portions of content between time T1 and time T3, during which the server 171 receives respective request for the different portions of content and transmits them one by one as they are requested over the respective network 190 to the communication device 121.

More specifically, with reference to FIG. 5, FIG. 6, and FIG. 7, the communication device 121 transmits the communications 411-1 over the network 190 to retrieve a respective first segment of content as indicated by the file path information such as "file path 1" in the communications 411-1. As previously discussed, the file path information "file path 1" specifies a corresponding segment (SEG1 or file) requested for retrieval by the communication device 121. The fully qualified domain name #1 corresponds to the network address XXXY assigned to the server 171. Accordingly, the request for segment 1 (such as communications 411-1) is transmitted from the communication device 121 over the network 190 to the server 171. The network 190 uses the destination address such as network address XXXY in the communications 411-1 to deliver the request for segment 1 to the server 171. The server 171 uses the file path information (file path 1) in the received communications 411-1 as a basis to retrieve the corresponding segment SEG1 associated with the title content #2 from the repository 181 for delivery to the communication device 121. In other words, at the server 171, the file path information such as "file path 1" associated with the requested segment of the title of content #2 stored in the repository 181 maps to the segment 1 (SEG1) associated with the title of content #2. The server 171 uses the file path information "file path 1" as a basis in which to retrieve the segment of content SEG1 from the repository 181 for subsequent transmission to the communication device 121. Thus, in response to receiving the request for segment 1 as specified by the "file path 1" information in the communications 411-1, the server 171 retrieves the segment 1 (SEG1) associated with the title content #2 and transmits it over the network 190 to the communication device 121.

The communication device 121 continues to retrieve the segments of content associated with the title of content #2 until the server 171 is no longer able to service the request for segments of content at or around time T3 or time T7 as previously discussed.

For example, after receiving the requested segment SEG1, the communication device 121 transmits the communications 411-2 over the network 190 to retrieve a respective second segment of content as indicated by the file path information such as "file path 2" in the communications 411-2. As previously discussed, the file path information "file path 2" specifies a corresponding segment (SEG2 or file) requested for retrieval by the communication device 121. The fully qualified domain name #1 (FQDN #1 or www.server1.com) corresponds to the network address XXXY assigned to the server 171. Accordingly, the request for segment SEG2 (such as communications 411-2) is transmitted from the communication device 121 over the network 190 to the server 171. The network 190 uses the destination address such as network address XXXY in the communications 411-2 to deliver the request for segment SEG2 to the server 171. The server 171 uses the file path information (file path 2) as a basis to map and retrieve the corresponding segment SEG2 associated with the title content #2 from the repository 181 for delivery to the communication device 121. In other words, at the server 171, the file path information such as specifying file path 2 associated with the requested segment of the title of content #2 stored in the repository 181 maps to the segment 2 (SEG2) associated with the title of content #2. The server 171 uses the file path information "file path 2" as a basis in which to retrieve the segment of content SEG2 from the repository 181. Thus, in response to receiving the request for segment SEG2 as specified by the file path 2 in the communications 411-2, the server 171 retrieves the segment 2 (SEG2) associated with the title content #2 and transmits it over the network 190 to the communication device 121.

As previously discussed, and as shown in the timing diagram 700, the communication device 121 and corresponding communication management resource 140 are successful retrieving the respective segments of content (SEG1, SEG2, . . . SEG100) associated with the requested title of content #2 (such as video or movie JAWS, etc.) from server 171.

At or around time T3, the communication management resource 140 transmits a respective request (based on communications 411-101) to the server 171 for retrieval of the segment SEG101 associated with the title of content #2. By the time T7, the communication management resource 140 corresponding communication device 121 have not received the requested segment of content SEG101 from the server 171 or an acknowledgment from the server 171 indicating that the request was received. In such an instance, to provide continuous playback of corresponding title of content #2 on the display screen 130, the communication management resource 140 switches over to using the second fully qualified domain name #2 (FQDN #2 or www.server2.com) and/or the network address XXXZ to retrieve the segment SEG101 from the server 172. As previously discussed, this includes replacing the prior use of the first fully qualified domain name #1 and/or network address XXXY (such as between time T1 and time T7) with use of the fully qualified domain name #2 and/or network address XXXZ to retrieve the respective segments of content associated with the title of content #2 from the server 172.

More specifically, at or around time T7, the communication management resource 140 causes the time monitor function 555 to start incrementing from a reference value such as 0 4 the suitable value. Rather than operate the communication device 121 to continuously transmit subsequent requests for the segments of content from the server 171 while it is failed, the communication device 121 switches over to the use of the second fully qualified domain name #2 and/or network address XXXZ to retrieve the segments of content (such as segments SEG101 to segments 200) from the backup server 172 until the time T8. In a similar manner as previously discussed, the communication device 121 plays back the corresponding retrieve segments on the display screen 130 as the segments of content are received one by one and buffered for playback that the communication device 121.

In this example, at or around time T8, the time monitor function 555 (such as counter or other suitable entity) reaches a threshold time level 705 (time duration TD2 or wait time) such as 10 seconds or other suitable amount. In response to reaching the threshold time 705, the communication management resource 140 and the corresponding communication device 121 use the first fully qualified domain name #1 again to request subsequent segments such as SEG201, SEG202, etc., from the server 171 with hopes that the server 171 is now functional again.

Assume in this example that the server 171 becomes available again to distribute content over the network 190 to the communication device 121 (such as at time Tx) occurring anytime between just after time T7 and just prior to time T8.

Given that the server 171 becomes available after time Tx, and is available and functioning properly to deliver content segments between time T8 and time T9, the communication device 121 and corresponding communication management resource 140 switch to retrieving the subsequent segments (such as segments SEG201, SEG202, . . . , SEG700) from the now healthy server 171. In other words, at around time T8, the communication device 121 and corresponding communication management resource 140 transmit a respective request over the network 190 to the server 171, wherein the request includes the path information (file path 201). In response to the server 171 transmitting the requested segment SEG201 over the network to the communication device 121, the communication device 121 continues to request subsequent segments such as SEG202, SEG203, etc., from the server 171.

The implementation of the delay time (time duration TD2) between time T7 and time T8 and transition over to retrieval of the segments of content SEG101, . . . , SEG200) during the temporary outage of the communication path between the communication device 121 and the server 171 or server 171 itself helps to alleviate network congestion associated with network 190 because it may take some time for the server 171 to become available again.

Figure 8:
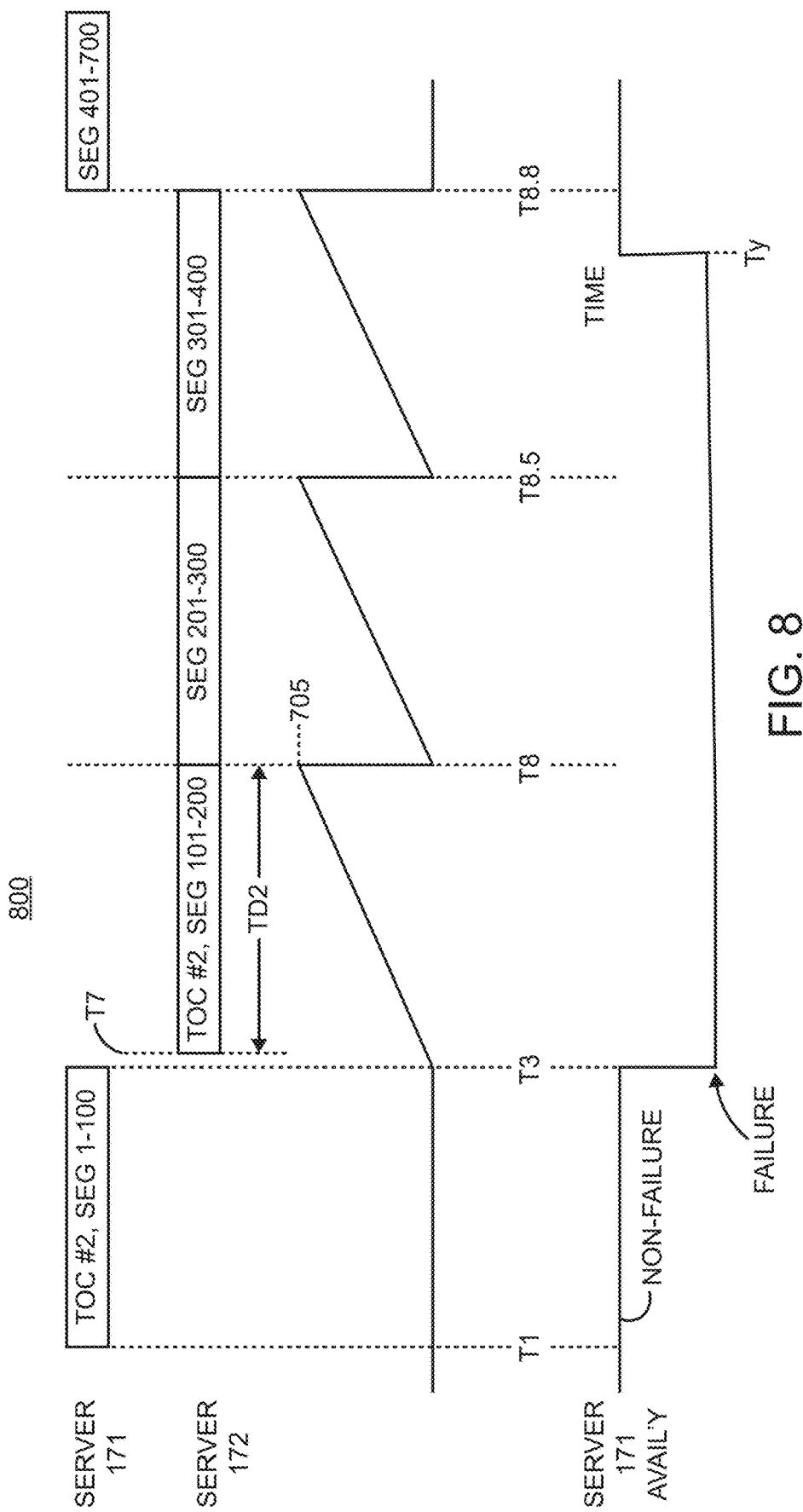
FIG. 8 is a timing diagram illustrating repeated implementation of a timer monitor function to control switchover retrieving segments of content from different content delivery networks as discussed herein.

FIG. 8 is a timing diagram illustrating implementation of a timer monitor function to control switchover retrieving segments of content from different content delivery networks as discussed herein.

In a similar manner as previously discussed, the communication device 121 successively or sequentially retrieves the segments of content 1-100 of the title of content #2 between time T1 and time T3. As shown in timing diagram 800, at time T7, the communication device 121 detects a respective failure associated with the retrieval of segments from the server 171. In response to this condition, the communication device 121 implements the time monitor function 555 to monitor the passage of time starting at or around time T7. In response to detecting at time T8 that the communication device 121 is unable to retrieve segment SEG201 from the server 171, the communication device 121 and corresponding communication management resource 140 continue communicating with the server 172 to retrieve the segments of content 201-300 between time T8 and time T8.5. The communication management resource 140 or other suitable entity resets the count value stored by the time monitor function 555 at time T8. The time monitor function 555 increments again starting from time T8 based on the detected inability to retrieve segments from the server 171 at or around time T8. At time T8.5, the time monitor function 555 reaches a respective threshold level 705.

In response to detecting at time T8.5 that the communication device 121 is unable to retrieve segment SEG301 from the server 171, the communication device 121 and corresponding communication management resource 140 continue communicating with the server 172 to retrieve the segments of content 301-400. The communication management resource 140 or other suitable entity resets the count value stored by the time monitor function 555 at time T8.5. The time monitor function 555 increments again starting from time T8.5 based on the detected inability to retrieve segments from the server 171 at or around time T8.5. At time T8.8, the time monitor function 555 reaches a respective threshold level 705 and is able to retrieve the segments 401-700 from the server resource 171 because it is available in online again at time Ty.

Note that the time duration TD2 can be adjusted to control how often the communication device 121 and corresponding communication management resource 140 attempt to communicate with the server 171 again subsequent to a failure.

Figure 9:
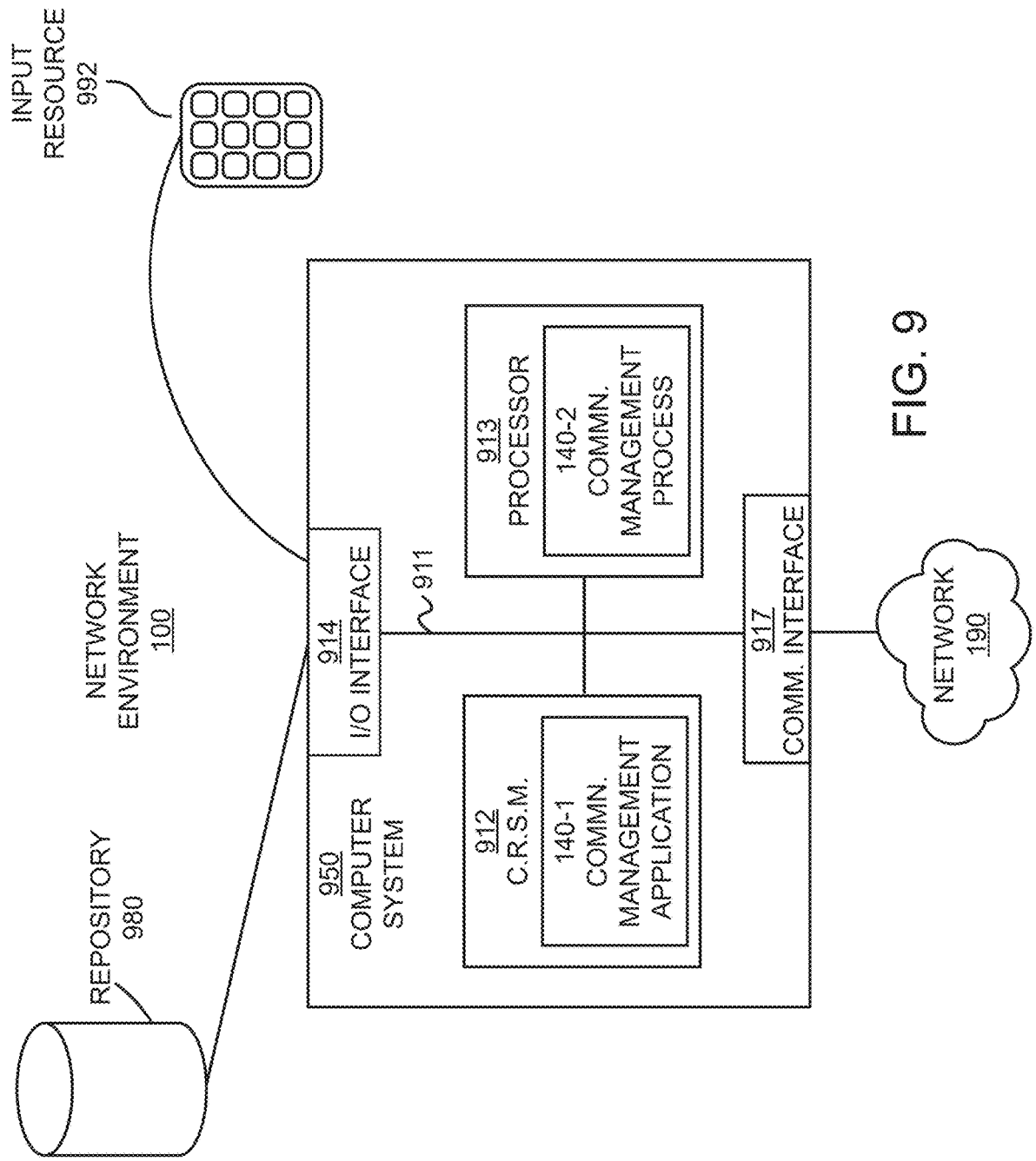
FIG. 9 is an example diagram illustrating example computer architecture operable to execute one or more operations as discussed herein.

FIG. 9 is an example block diagram of a computer system for implementing any of the operations as previously discussed according to examples herein.

Any of the resources (such as communication device 121, communication management resource 140, time monitor function 555, server 171, server 172, etc.) as discussed herein can be configured to include computer processor hardware and/or corresponding executable instructions to carry out the different operations as discussed herein via computer system 950.

As shown, computer system 950 of the present example includes an interconnect 911 coupling computer readable storage media 912 such as a non-transitory type of media or, more generally, computer readable hardware which can be any suitable type of hardware storage medium in which digital information can be stored and retrieved, a processor 913 (computer processor hardware), I/O interface 914, and a communications interface 917.

I/O interface(s) 914 supports connectivity to repository 980 and input resource 992.

Computer readable storage medium 912 (such as computer readable hardware or other suitable entity) can be any hardware storage device such as memory, optical storage, hard drive, floppy disk, etc. In one example, the computer readable storage medium 912 stores instructions and/or data.

As shown, computer readable storage media 912 can be encoded with communication management application 140-1 (e.g., including instructions) to carry out any of the operations as discussed herein.

During operation of one example, processor 913 accesses computer readable storage media 912 via the use of interconnect 911 in order to launch, run, execute, interpret or otherwise perform the instructions in communication management application 140-1 stored on computer readable storage medium 912. Execution of the communication management application 140-1 produces the communication management process 140-2 to carry out any of the operations and/or processes as discussed herein.

Those skilled in the art will understand that the computer system 950 can include other processes and/or software and hardware components, such as an operating system that controls allocation and use of hardware resources to execute the communication management application 140-1.

In accordance with different examples, note that computer system may reside in any of various types of devices, including, but not limited to, a mobile computer, a personal computer system, wireless station, connection management resource, a wireless device, a wireless access point, a access point, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein. In one example, the control system 950 can include or be implemented in virtualization environments such as the cloud.

Functionality supported by the different resources will now be discussed via flowchart in FIG. 10. Note that the steps in the flowcharts below can be executed in any suitable order.

Figure 10:
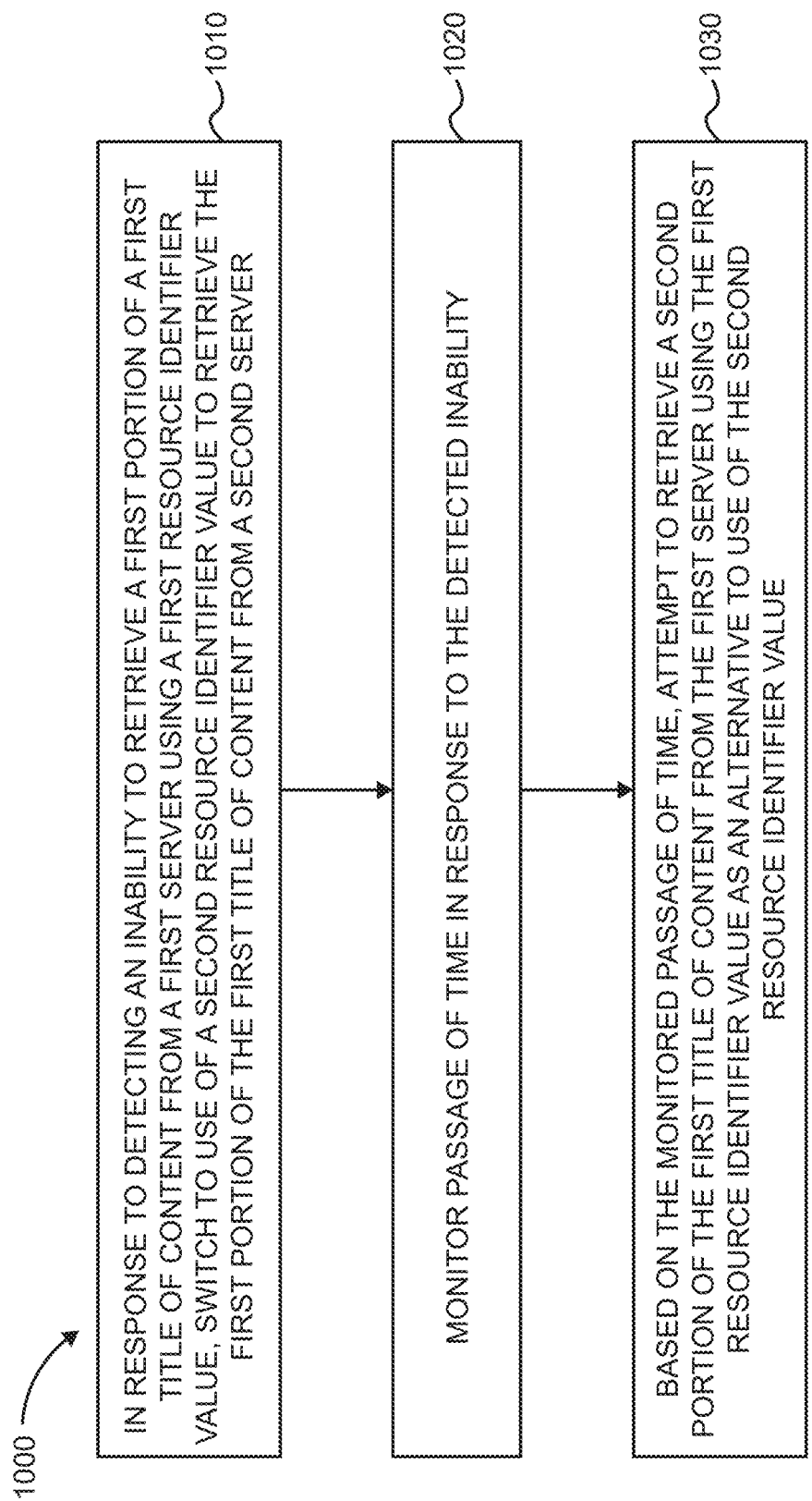
FIG. 10 is an example diagram illustrating a method as discussed herein.

FIG. 10 is a flowchart 1000 illustrating an example method according to examples. Note that flowchart 1000 overlaps/captures general concepts as discussed herein.

In processing operation 1010, in response to detecting an inability to retrieve a first portion of a selected title of content (as specified by the input 104) from a first server 171 using a first resource identifier value (such as using fully qualified domain name #1 and/or network address XXXY), the communication management resource 140 switches to use of a second resource identifier value (such as using fully qualified domain name #2 and/or network address XXXZ) to retrieve the first portion (such as segment 101 or other segment) of the first title of content from a second server 172.

In processing operation 1020, via the time monitor function 555, the communication management resource 140 monitors passage of time in response to the detected inability.

In processing operation 1030, based on the monitored passage of time, the communication management resource 140 attempts to retrieve a second portion (such as segment 201) of the first title of content from the first server 171 using the first resource identifier value (such as first uniform resource locator or URL or network address XXXY) as an alternative to use of the second resource identifier value (such as a second uniform resource locator or URL or network address XXXZ).

Note again that techniques herein are well suited to facilitate retrieving content from a backup server during conditions in which a primary server is unavailable. However, it should be noted that examples herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred examples thereof, it will be understood by those skilled in the art that various changes in form and details may be made therein without departing from the spirit and scope of the present application as defined by the appended claims. Such variations are intended to be covered by the scope of this present application. As such, the foregoing description of examples of the present application is not intended to be limiting. Rather, any limitations to the invention are presented in the following claims.

We claim:

1. A method comprising:
in response to detecting an inability to retrieve a first portion of first content from a first server using a first resource identifier value, switching to use of a second resource identifier value to retrieve the first portion of the first content from a second server;
monitoring passage of time in response to the detected inability; and
based on the monitored passage of time, attempting to retrieve a second portion of the first content from the first server using the first resource identifier value.

2. The method as in claim 1, wherein the second server is a backup server with respect to the first server; and
wherein the second server is operative to distribute the first content including the first portion of the first content and the second portion of the first content during conditions in which the first server experiences a failure.

3. The method as in claim 1 further comprising:
attempting to retrieve the second portion of the first content from the first server in response to detecting that the monitored passage of time is greater than a threshold level.

4. The method as in claim 3, wherein the passage of time is measured with respect to a time instance associated with the detected inability to retrieve the first portion of the first content from the first server.

5. The method as in claim 1, wherein the first resource identifier value specifies the first server; and
wherein the second resource identifier value specifies the second server, the second server being a backup server with respect to the first server.

6. The method as in claim 1, wherein detecting the inability to retrieve the first content from the first server includes:
transmitting a first message from a client device to retrieve the first portion of the first content, the first message including the first resource identifier value, the first resource identifier value specifying a network address assigned to the first server; and
failing to receive the first portion of the first content from the first server within a predetermined amount of time.

7. The method as in claim 6, wherein using the second resource identifier value to retrieve the first portion of the first content includes:
substituting the first resource identifier value in the first message with the second resource identifier value to produce a second message destined for delivery to the second server, the second server being a backup server with respect to the first server to distribute the first content, the second resource identifier value specifying a network address of the second server; and
transmitting the second message from the client device to the second server to retrieve the first portion of the first content.

8. The method as in claim 1, wherein monitoring the passage of time includes:
starting a timer in response to detecting the inability to retrieve the first portion of the first content from the first server using the first resource identifier value.

9. The method as in claim 1 further comprising:
in response to detecting an inability to retrieve the second portion of the first content from the first server using the first resource identifier value, attempting to retrieve the second portion of the first content from the second server using the second resource identifier value.

10. The method as in claim 9, wherein the monitored passage of time is a monitored first passage of time, the method further comprising:
monitoring a second passage of time with respect to the detected inability to retrieve the second portion of the first content from the first server using the first resource identifier value; and
based on the monitored second passage of time, attempting to retrieve a third portion of the first content from the first server using the first resource identifier value.

11. The method as in claim 1 further comprising:
switching between use of the first resource identifier value and the second resource identifier value to retrieve different portions of the first content.

12. A system comprising:
communication management hardware operative to:
in response to detecting an inability to retrieve a first portion of first content from a first server using a first resource identifier value, switch to use of a second resource identifier value to retrieve the first portion of the first content from a second server;
monitor passage of time with respect to the detected inability; and
based on the monitored passage of time, attempt to retrieve a second portion of the first content from the first server using the first resource identifier value.

13. The system as in claim 12, wherein the second server is a backup server with respect to the first server; and
wherein the second server is operative to distribute the first content including the first portion of the first content and the second portion of the first content during conditions in which the first server experiences a failure.

14. The system as in claim 12, wherein the communication management hardware is further operative to:
attempt to retrieve the second portion of the first content from the first server in response to detecting that the monitored passage of time is greater than a threshold level.

15. The system as in claim 14, wherein the passage of time is measured with respect to a time of the detected inability to retrieve the first portion of the first content from the first server.

16. The system as in claim 12, wherein the first resource identifier value specifies the first server; and
wherein the second resource identifier value specifies the second server, the second server being a backup server with respect to the first server.

17. The system as in claim 12, wherein the communication management hardware is further operative to:
transmit a first message from a client device to retrieve the first portion of the first content, the first message including the first resource identifier value, the first resource identifier value specifying a network address assigned to the first server; and
fail to receive the first portion of the first content from the first server within a predetermined amount of time.

18. The system as in claim 17, wherein the communication management hardware is further operative to:
substitute the first identifier resource value in the first message with the second resource identifier value to produce a second message destined for delivery to a second server, the second server being a backup server with respect to the first server to distribute the first content, the second resource identifier value specifying a network address of the second server; and
transmit the second message from the client device to the second server to retrieve the first portion of the first content.

19. The system as in claim 12, wherein the communication management hardware is further operative to:
start a timer in response to detecting the inability to retrieve the first portion of the first content from the first server using the first resource identifier value.

20. The system as in claim 12, wherein the communication management hardware is further operative to:
in response to detecting an inability to retrieve the second portion of the first content from the first server using the first resource identifier value, attempt retrieval of the second portion of the first content from the second server using the second resource identifier value.

21. The system as in claim 20, wherein the monitored passage of time is a monitored first passage of time;
wherein the communication management hardware is further operative to:
monitor a second passage of time with respect to the detected inability to retrieve the second portion of the first content from the first server using the first resource identifier value; and
based on the monitored second passage of time, attempt to retrieve a third portion of the first content from the first server using the first resource identifier value.

22. The system as in claim 12, wherein the communication management hardware is further operative to:
switch between use of the first resource identifier value and the second resource identifier value to retrieve different portions of the first content.

23. Computer-readable storage hardware having instructions stored thereon, the instructions, when carried out by computer processor hardware of, cause the computer processor hardware to:
in response to detecting an inability to retrieve a first portion of first content from a first server using a first resource identifier value, switch to use of a second resource identifier value to retrieve the first portion of the first content from a second server;
monitor passage of time with respect to the detected inability; and
based on the monitored passage of time, attempt to retrieve a second portion of the first content from the first server using the first resource identifier value.

* * * * *